UNITED STATES PATENT OFFICE.

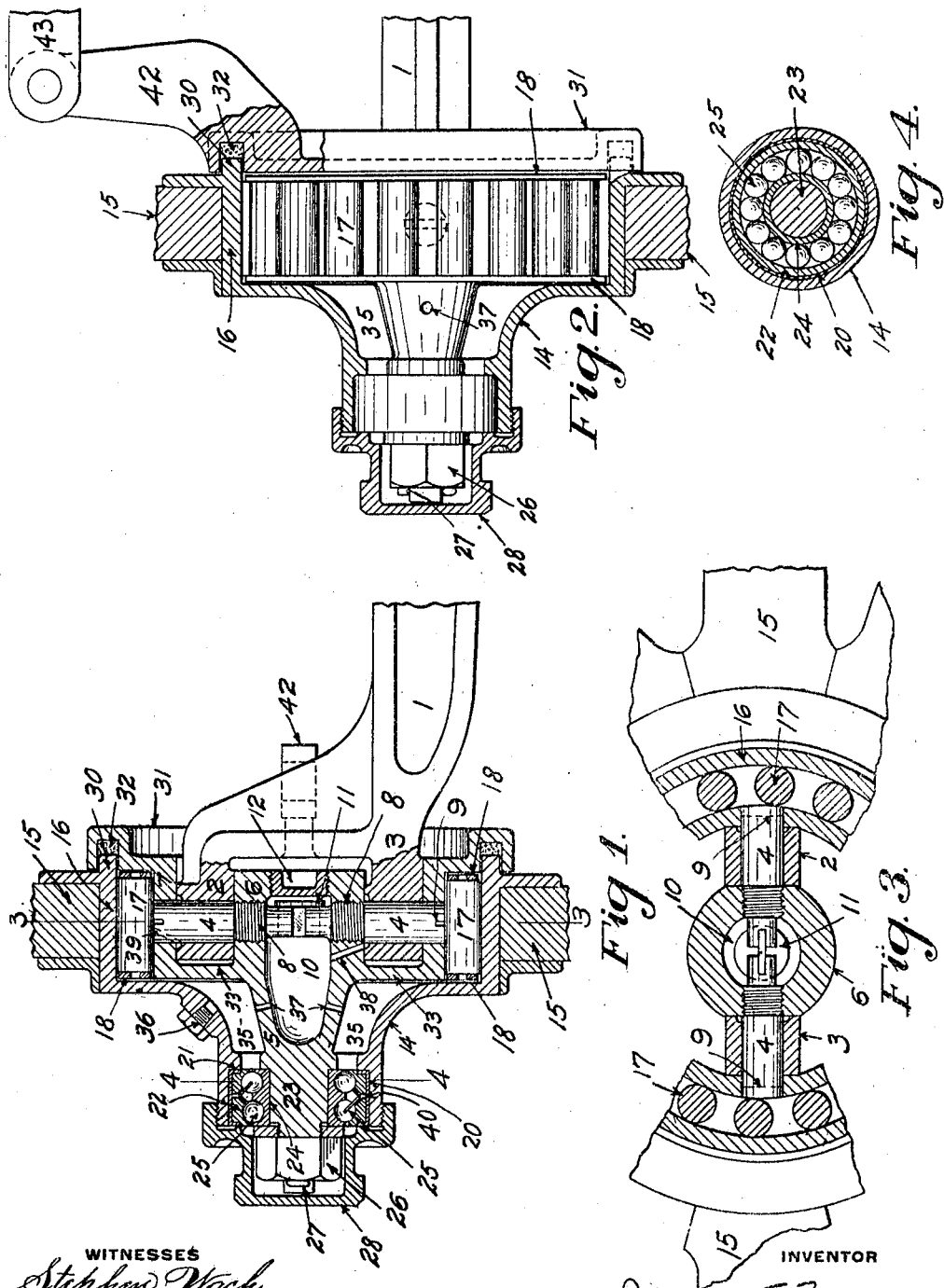

JAMES E. MURRAY, OF McKEESPORT, PENNSYLVANIA.

VEHICLE WHEEL AND AXLE.

1,026,220.   Specification of Letters Patent.   Patented May 14, 1912.

Application filed April 21, 1910. Serial No. 556,681.

*To all whom it may concern:*

Be it known that I, JAMES E. MURRAY, a resident of McKeesport, in the county of Allegheny and State of Pennsylvania, have invented a new and useful Improvement in Vehicle Wheels and Axles, of which the following is a specification.

This invention relates to vehicle wheels and axles of the class in which the wheel journal or skein is hinged to the axle for the purpose of steering the vehicle, as is the case with motor vehicles.

The object of the invention is to provide a vehicle wheel and axle of the character named, which is simple, strong and very durable, and especially one so constructed as to exclude the dust from the wearing parts and so as to admit of thorough lubrication of the wearing parts.

To this end the invention comprises the construction and arrangement of parts hereinafter described and claimed.

The invention also includes certain parts and features relating to other objects or purposes than those named, all as will hereinafter appear.

In the accompanying drawing Figure 1 is a vertical section through the wheel taken longitudinally of the axle; Fig. 2 is a horizontal section taken longitudinally through the wheel hub and showing the skein bearings in plan view; Fig. 3 is a vertical section transversely of the axle taken on the line 3—3, Fig. 1; and Fig. 4 is a similar view taken on the line 4—4, Fig. 1.

The axle 1 may be of any desired or preferred construction, and is either double or at least forked at its end as shown, so as to provide the arms 2 and 3 with openings in alinement with each other for receiving the pivot members or trunnions 4.

The wheel journal or skein is indicated generally at 5, and this at its inner end is very much enlarged and provided with two substantially concentric portions, to wit: an inner portion 6 and an outer portion or flange 7, these parts being arranged on diametrically opposite sides with alining openings for receiving the trunnions or pivot members 4. The latter members are threaded at their inner ends as at 8, and the holes for receiving said inner ends are similarly threaded. The outer ends of the trunnions 4 are provided with slots or kerfs 9 or other suitable means for receiving a screw driver or other instrument by means of which they can be inserted and taken out. The arms 2 and 3 of the forked axle lie between the central part 6 and the outer portion or flange 7 of the wheel journal or skein, as shown.

The central portion 6 of the wheel journal or skein is preferably made hollow as shown to provide for lubricating the trunnions as hereinafter described, and to admit means for locking the trunnions 4 from accidental unscrewing. To this end the inner ends of said trunnions are provided with slots, as shown in Fig. 3, which when said trunnions are in proper position are in alinement with each other. Inserted in said alining slots is the locking key or plate 11, which is held against coming out by means of a closure for the hollow portion of the journal or skein, said closure being shown in the form of a threaded plug 12. This feature constitutes one of the parts of the invention herein claimed.

The wheel hub is indicated generally at 14, this being hollow or recessed, said recess being of large size or diameter in the plane of the spokes 15, and being reduced in diameter outwardly. In the plane of the spokes the inner face of said recessed hub is provided with the bearing face 16 for receiving roller bearings 17 which surround the enlarged portion or flange 7 of the wheel journal or skein.

The outer face of the wheel journal or skein is cylindrical at the point where the roller bearing contacts therewith. The roller bearings may be of any suitable type being shown as of a well known type comprising cylindrical rolls held apart by means of spacing rings 18 which form a cage.

It will be observed that the trunnions 4 are located in the plane of the spokes, and consequently are not subjected to twisting stresses. This however is not new *per se*.

According to another part of the invention the outer reduced portion of the hub is provided internally with seat 20 which ends in a shoulder 21 toward the interior, which seat receives the ball race 22. On the reduced outer portion 23 of the journal or skein is a coöperating ball race 24, said races being provided with one or more grooves for receiving the balls 25, two such sets of grooves and balls being shown. The shoulder 21 prevents the ball races from being displaced inwardly, and said races are prevented from being displaced outwardly by a flanged nut 26 fitting the threaded outer end of the journal or skein. Both ball races are cylindrical, one within the other, and the grooves therein are semi-cylindrical, so that the balls in said grooves prevent axial movement of the hub and skein, thereby relieving the cylindrical roller bearings 17 of all endwise thrust and greatly reducing friction due to such cause. A cotter pin 27 is also preferably provided to prevent the nut from coming off. The nut is concealed to render the outer face of the axle more sightly, and also to exclude dust, by means of a cap 28 having a threaded engagement with the outer face of the reduced portion of the hub.

To prevent dust from getting into the bearings from the inside of the wheel the hub and journal or skein are provided with interlocking flanges, one of said parts being provided with a groove to receive the other part, with an interposed packing. As shown, the hub is provided with the annular flange 30 while the journal is provided with a corresponding groove in an outwardly projecting flange 31, said groove receiving a packing 32 of felt or other material which prevents the entry of dust. The recesses in the journal or skein for receiving the arms of the axle do not extend entirely through said journal or skein, but are closed on the outer side by the walls 33, thereby preventing dust from entering at this point. As a consequence the entire bearing is practically sealed against the entrance of dust or grit.

According to another part of the invention there is between the hub and the journal or skein an ample chamber 35 for receiving the oil or other lubricant which may be introduced through any suitable opening such as opening 36. This chamber communicates through the ports 37 with the interior hollow or chamber 10 of the journal; from this point a port 38 leads to the bearings of the lower trunnion 4. Oil can also pass downwardly from chamber 35 into the chamber of larger diameter in which the ball bearing 17 runs, and from the upper portion of said bearing a port 39 leads to the bearings of the upper trunnion 4. As a consequence both trunnions are thoroughly lubricated. From the chamber 35 the oil can also flow into the inner ball race 25 as will be apparent, and the two races are connected by V-shaped grooves or ports 40. The flange 31 of the journal or skein is provided with a projecting arm 42, preferably integral therewith, for receiving the link 43 of the steering mechanism, as will be readily understood.

The wheel described has the pivots or trunnions of the axle in the plane of the spokes, thereby relieving said pivots or trunnions largely from all bending strains. Furthermore, said pivots or trunnions are supported at both ends, and consequently will withstand very heavy strains without bending or breaking. Practically the only way to destroy or injure said pivots or trunnions is by shearing them off, which is not likely to occur. The bearings are so constructed as to be practically sealed against dust and grit, and also can be thoroughly lubricated. The parts are so simple and compact that they can be applied in a vehicle wheel of ordinary size and the entire hub and wheel construction is sightly and therefore adapted for motor vehicles of all types. The end thrust of the journal in the hub is taken care of by the ball bearings 25 in the coöperating races 22 and 24, these races being held against inward movement by the shoulder 21 on the hub, and against outward movement by the nut 26 screwed on to the outer end of the journal or skein.

What I claim is:

1. In a vehicle, the combination of an axle, a wheel provided with a hub having a large recess in the plane of the spokes and a contracted recess extending outside of said plane, a wheel journal hinged to the axle, cylindrical roller bearings between said journal and hub substantially in the plane of the spokes and contacting directly with the inner face of the hub and the outer face of the journal, a ball race in the contracted outer portion of the hub and bearing against an internal shoulder therein, a cap secured to the hub and closing the outer end thereof and clamping said ball race against said internal shoulder, a ball race fitting on the outer end of the journal against an external shoulder thereon, a collar secured to the journal and clamping said ball race against said external shoulder, said ball races being one within the other and having their coöperating faces substantially parallel to the axis of the wheel and provided with registering semi-circular ball receiving grooves, and balls in said grooves.

2. In a vehicle, the combination of an axle, a wheel provided with a hub, a wheel journal, trunnions connecting said journal and axle, said trunnions having a threaded connection in the journal, and means for locking said trunnions against rotation.

3. In a vehicle, the combination of an axle, a wheel provided with a hub, a wheel journal projecting into the hub and having bearing therein and provided on its inner end with a central recess, trunnions connecting the journal to the axle, said trunnions having a threaded connection in the journal and extending into the central recess therein, and means in said central recess for preventing rotation of said trunnions.

4. In a vehicle, the combination of an axle, a wheel provided with a hub, a wheel journal projecting into the hub and having a bearing therein and provided at its inner end with a central recess and with concentric portions provided with alining openings, trunnions fitting into said alining openings, said trunnions having a threaded connection in the journal, and extending into the central recess in said journal, a key arranged to engage the ends of said trunnions and prevent rotation thereof, and a closure for said central recess.

5. In a vehicle, the combination of a forked axle, a hub, a wheel journal hinged to the forks of the axle by oppositely arranged trunnions and projecting into said hub and having bearing therein and provided at its inner end with a centrally closed chamber, said journal and hub providing an oil chamber therebetween, a port in the journal extending from said oil chamber to the chamber in the journal, a port extending from said central chamber to the lower trunnion, a roller bearing surrounding the journal in the plane of the trunnions, and an oil duct extending inwardly through the journal from the roller bearing to the upper trunnion.

In testimony whereof, I have hereunto set my hand.

JAMES E. MURRAY.

Witnesses:
JESSE W. REEDY,
FREDERICK BURKERT.

Copies of this patent may be obtained for five cents each, by addressing the "Commissioner of Patents, Washington, D. C."